United States Patent [19]

Chande et al.

[11] Patent Number: 4,868,361

[45] Date of Patent: Sep. 19, 1989

[54] COUPLING DEVICE FOR HIGH POWER LASER BEAM TRANSMITTING OPTICAL FIBERS

[75] Inventors: Tushar S. Chande, Pittsburgh, Pa.; Angel L. Ortiz, Jr., Scotia, N.Y.

[73] Assignee: General Electric Company, Schenectady, N.Y.

[21] Appl. No.: 175,884

[22] Filed: Apr. 1, 1988

[51] Int. Cl.[4] ............................................. B23K 26/04
[52] U.S. Cl. ........................... 219/121.62; 219/121.75; 219/121.78; 219/121.83; 350/96.18; 350/480
[58] Field of Search ...................... 219/121.61, 121.62, 219/121.75, 121.73, 121.78, 121.6, 121.85; 350/574, 480, 96.18, 96.21

[56] References Cited

U.S. PATENT DOCUMENTS

| | | | |
|---|---|---|---|
| 4,078,852 | 3/1978 | Lebduska | 350/96.18 |
| 4,183,618 | 1/1980 | Rush et al. | 350/96.18 |
| 4,421,383 | 12/1983 | Carlsen | 350/96.18 X |
| 4,509,827 | 4/1985 | Cowen et al. | 350/96.18 X |
| 4,544,232 | 10/1985 | Laude | 350/96.18 X |
| 4,732,450 | 3/1988 | Lee | 350/96.18 |

FOREIGN PATENT DOCUMENTS 1146619  8/1985  U.S.S.R. ........................... 350/96.18

*Primary Examiner*—C. L. Albritton
*Attorney, Agent, or Firm*—Paul R. Webb, II; James C. Davis, Jr.

[57] ABSTRACT

A fiber optic coupling device for coupling two optical fibers transmitting a high power laser beam is disclosed. In one embodiment, the device comprises a first lens to collimate the beam delivered by one of the optical fibers and a second lens to focus that collimated beam onto the end of the other fiber for injection therein and continued transmission of the power laser beam through the second fiber.

11 Claims, 6 Drawing Sheets

COUPLING DEVICE FOR HIGH POWER LASER BEAM TRANSMITTING OPTICAL FIBERS

The present invention is related in general to fiber optic couplers and, more specifically, to a coupling device for coupling two optical fibers for the transmission of a power laser beam.

BACKGROUND OF THE INVENTION

There are at least two major techniques known in the art for coupling together the ends of two optical fibers to enable the laser beam being transmitted through one such fiber to efficiently enter and be transmitted by the other fiber. Each such technique is, however, to the extent the inventors herein are aware, limited to communication and low power applications in which the laser beam average power is substantially less than one watt. Such techniques for coupling fibers transmitting low power laser beams are unsuitable for high power laser beam applications. High power is used herein to refer to laser beams having an average power ranging from approximately one watt to hundreds of watts. The terms "power" and "high power" are used interchangeably herein to describe high power laser beams. Design considerations and different coupling techniques for coupling fibers transmitting low power laser beams are surveyed in the paper entitled "A Review of Optical Fiber Connection Technology" by Dalgleish, Proceedings of 25th International Wire and Cable Symposium, November 1976, pp. 240–246. The known coupling techniques and apparatus can, generally, be divided into two broad categories. The first category consists of splicing techniques in which the ends of the respective fiber cores to be coupled are abutted and then fused together. U.S. Pat. No. 4,263,495 to Fujita et al. discloses such a technique in which the fuming is achieved by irradiation of the abutting fiber ends with a $CO_2$ laser. A technique for fiber end fusion by heating the abutting ends with an electric arc is described in the paper entitled "Fusion Splices in Single-Mode Optical Fibers" by Hatakeyama et al., IEEE Journal of Quantum Electronics, Vol. QE-14, August 1978, pp. 614–619. Such splicing methods result in average splicing losses that are apparently acceptable for communication or low power apparatus. Further, such techniques are only illustrated and described for practice on small diameter fibers, e.g. 10 micrometers or less, such fibers only being capable of single mode beam transmission. In contrast, fibers having diameters in excess of 100 micrometers are typically employed for the multimode transmission of power laser beams. There is no apparent suggestion or intention that the fibers spliced in accordance with the prior art splicing techniques are suitable for transmitting a high power laser beam. The inventors herein believe that based on the dB losses indicated for such splices, transmission of a power laser beam through the splice would result in heat generation and subsequent failure of the splice. Since no technique appears to exist for splicing together optical fibers of sufficiently large diameter and to achieve sufficiently low losses for power laser beam transmission, this technique is believed by the instant inventors to be unsuitable for power laser beam applications.

The second category of techniques for coupling two optical fibers consists of using a connector. In one type of connector, the respective end portions of the fibers being butt connected are each rigidly supported, e.g. in a close fitting bore, in respective connector halves. Then, when the two connector halves are fastened together, such as by screw engagement, the fiber ends are rigidly aligned and substantially abutting. The accuracy of the alignment of the respective fiber ends is dependent on the precision with which the connector is fabricated. In some such connectors, each fiber end may be supported by a metal or ceramic ferrule which is in turn supported within the connector body. Another type of connector comprises a single sleeve with a bore narrowing from both ends to guide into alignment the respective fiber cores being coupled. Such connectors typically include immersion of the respective end portions of the fiber cores in an index matching gel in order to minimize transmission losses. Neither of the above described types of connectors are available for high power laser beam applications with respect to either accommodating sufficient fiber diameter or laser power. With respect to the connector type comprising engaging halves, any misalignment would result in a stray portion of the power laser beam impinging on a portion of the connector body, and/or supporting ferrule, to cause heating. Such heating will at very least cause thermal distortion, if not physical damage, to the connector resulting in further misalignment. Further, fiber misalignment may result in thermally induced damage to the fiber end intended to receive the power laser beam. Additionally, as described in greater detail below and as known in the art, power laser beam injection into an optical fiber is most efficiently achieved where the beam is focussed onto the prepared fiber end in accordance with specific criteria. Thus, the mere abutting alignment of two fibers results in an extremely inefficient connection. The above described single sleeve connector type also suffers from the shortcomings of merely relying on end-to-end fiber alignment. Additionally, the inventors have observed that the index matching gels typically employed in the art are absorptive of energy carried in the power laser beam and, as a result, will burn causing connector failure.

In addition to the above described two broad categories of coupling techniques, the instant inventors are aware of a particular connector manufactured by Eastman Kodak Company as a LAMDEK single-mode connector. The connector employs two glass aspheric lenses to respectively collimate the laser beam emanating from one fiber end and focus the collimated beam onto the other fiber end. The end portion of each fiber is encased in a glass ferrule and each fiber tip and ferrule are affixed to the surface of its associated lens with an index matching cement. The LAMDEK connector appears not to be intended for use in high power laser beam applications and, in any event, is unsuitable for high power applications for several reasons. First, its single mode characteristic limits the fiber diameter that can be coupled to approximately 10 micrometers or less. Typical power laser beam applications require multimode beam transmission and employ fiber diameters on the order of from 100 to 1000 micrometers or larger. Second, the lenses are fabricated of glass and are therefore unsuitable for high power laser beam applications. It is the experience of the instant inventors that glass lenses thermally distort and crack upon subjection to even moderate beam power densities. Third, the fact that the ferrules are composed of glass renders them susceptible to fracture should a portion of the power laser beam impinge thereon due to misalignment. Fourth, the LAMDEK device depends on affixing, with cement, each fiber tip, and ferrule, to its associated lens to enable adjustable alignment between the fiber ends. It is the instant inventor's experience that, as with the above noted index matching gel, no cement will withstand the power densities experienced during high power laser beam transmission. Thus, since the alignment feature depends on the ability to affix fiber to lens, the LAMDEK connector is neither suitable for nor adaptable to high power laser beam applications.

It is therefore a principal object of the present invention to provide a coupling device for coupling high power laser beam transmitting optical fibers that is not subject to the aforementioned inadequacies of prior art coupling techniques and devices.

SUMMARY OF THE INVENTION

In accordance with the present invention, there is provided apparatus for coupling a power laser beam transmitted through a first optical fiber into a second optical fiber. The apparatus comprises first lens means to collimate the power laser beam emitted from an end of the first fiber and second lens means to focus a collimated beam applied thereto as a focussed spot on an end of the second fiber. The respective ends of the first and second fibers are prepared in advance in a predetermined fashion for fiber coupling. The first and second lens means are selected so that the second lens means focuses the collimated beam applied thereto to achieve an entry cone angle that is less than two times an angle corresponding to a numerical aperture of the second fiber and a focussed spot having a diameter that is less than the diameter of a core portion of the second fiber. The first and second lens means and first and second fiber ends are mounted in alignment so that the power laser beam transmitted through the first fiber and emitted from the end thereof is collimated by the first lens means and focussed by the second lens means onto the second end for injection into the second fiber and transmission therethrough. In accordance with a first embodiment of the present invention, the collimated beam provided by the first lens means is applied directly to the second lens means and focussed thereby onto the second fiber end.

In accordance with the second embodiment of the present invention, the coupling apparatus further includes third lens means to expand the first collimated beam portion provided by the first lens means, that collimated beam having a first diameter, into a second collimated beam portion having a second beam diameter greater than the first beam diameter. As a result, the divergence of the second collimated beam portion is smaller than the divergence of the first collimated beam portion, so that the second lens means can focus the second collimated beam portion to achieve a smaller spot diameter corresponding to the smaller divergence of the second collimated beam portion. With respect to the first and second embodiments of the present invention, each lens means can be provided as one or more lenses for performing the required function of that lens means, i.e. collimating, expanding or focussing.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

DESCRIPTION OF THE INVENTION

Figure 1:
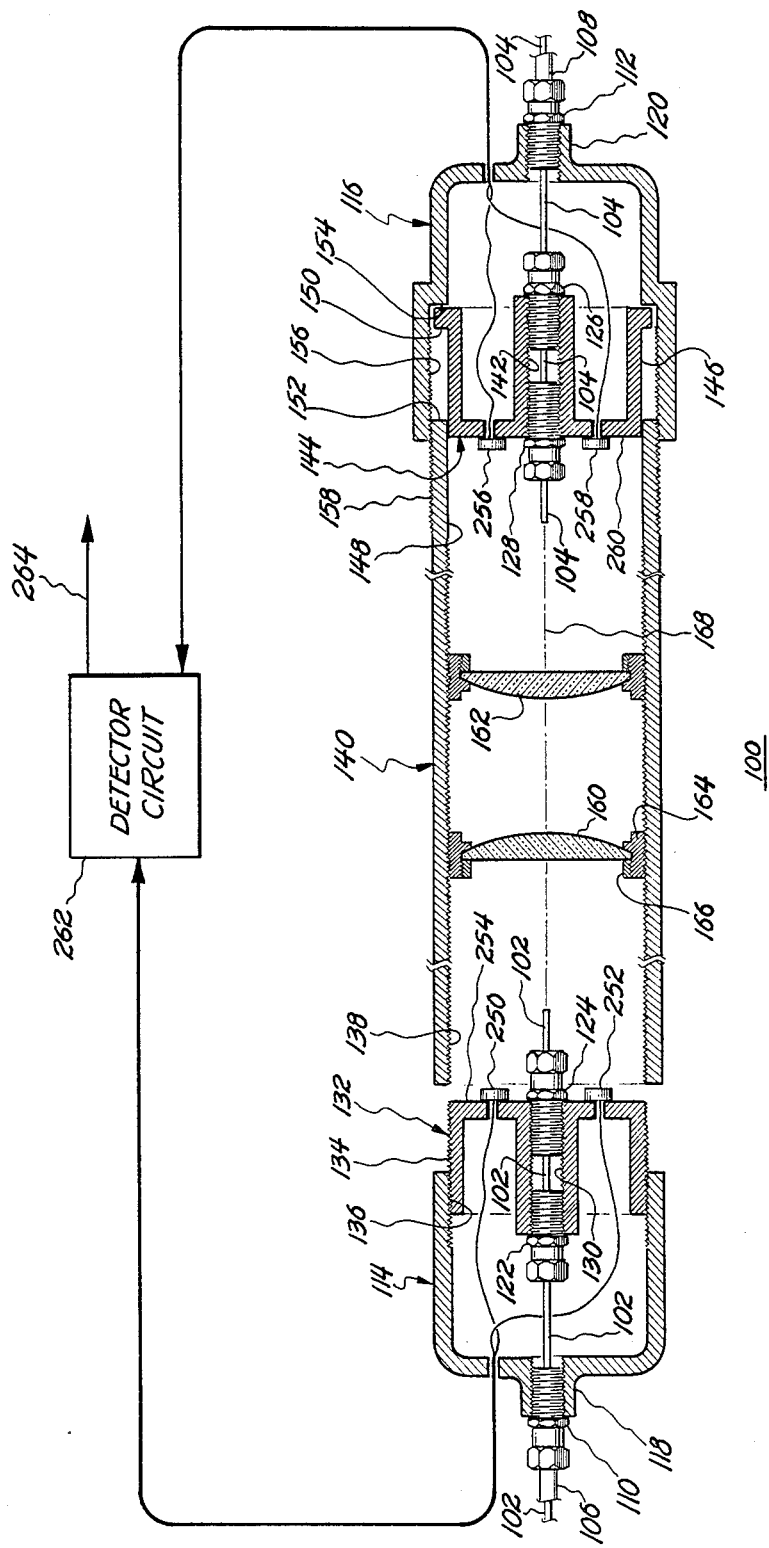
FIG. 1 illustrates a fiber optic coupling device constructed in accordance with a first embodiment of the present invention.

Referring now to the drawings, FIG. 1 shows a partially exploded sectional view of a fiber optic coupling device 100, for coupling optical fibers transmitting a high power laser beam, constructed in accordance with a first embodiment of the present invention. Device 100, which has an overall cylindrical shape, serves to couple the beam transmitted through a first optical fiber 102 into a second optical fiber 104. Fibers 102 and 104, which need not be of the same diameter, are respectively enclosed in protective polyethylene tubing 106 and 108, the practice of using protective tubing being preferred by the instant inventors but not essential to the practice of the present invention. For the transmission of a high power laser beam, fibers 102 and 104 are preferably of the step-index type. Fibers 102 and 104 are respectively introduced through connectors 110 and 112 which are respectively mounted in opposing, generally cylindrical end cap portions 114 and 116 of device 100. Connectors 110 and 112 each include a threaded male end which matingly screws into interior threaded neck portions 118 and 120, respectively, of end cap portions 114 and 116. Each connector 110,112 serves to rigidly grasp the polyethylene tubing containing the fiber passing therethrough. The tubing is terminated within the body of the connector so that only the fiber emanates therefrom. Each connector may be provided as a tube fitting such as a model FH4BZ thermocouple connector manufactured by the Instrumentation Connectors Division of Parker Hannifin Corporation of Huntsville, Alabama. Comparable connectors are available as Swagelok tube fittings manufactured by the Crawford Fitting Company of Solon, Ohio.

The fiber emanating from each connector 110,112 of device 100 is next supported in two additional connectors which may also be provided as tube fittings of the type described above. Thus, fiber 102 emanating from connector 110 is supported in connectors 122 and 124 and fiber 104 emanating from connector 112 is supported in connectors 126 and 128. With respect to fiber 102, each connector 122,124 grasps the fiber and is in turn mounted, through screw engagement of its male end, within a threaded inner bore 130 of an interior mounting bracket 132. Bracket 132 also carries an external threaded surface 134 for engagement with an interior threaded surface portion 136 of end cap portion 114 and for engagement with an interior threaded surface 138 of a cylindrical barrel portion 140 of device 100. Since FIG. 1 is shown as a partially exploded view, the latter engagement between bracket 132 and barrel 140 is not shown. Each connector 126 and 128 grasps fiber 104 and is mounted, through screw engagement of its male end, within a threaded inner bore 142 of an interior mounting bracket 144. An external surface 146 of bracket 144 is machined smooth and cylindrical and has an overall diameter to enable a tight sliding fit with a smooth interior surface portion 148 of barrel 140. Bracket 144 further includes a shoulder portion 150 which seats against an end surface 152 of barrel 140 when device 100 is fully assembled. Due to the partially exploded nature of FIG. 1, the seating of shoulder 150 against end surface 152 is not shown. End cap portion 116 includes a shoulder portion 154 which aligns with shoulder 150 and an interior threaded portion 156 which engages an external threaded portion 158 of barrel 140. Interior bracket 144 is thus held in place with shoulder 150 seated against end surface 152 by the screw engagement of end cap interior thread 156 with barrel thread 158 and end cap shoulder 154 seated against bracket shoulder 150. Provision of the sliding fit between interior bracket 144 and barrel 140 is provided to facilitate assembly of device 100. It is noted that the use of two connectors within each interior bracket is preferred herein in order to provide two points of support of each fiber and thereby eliminate the possibility of pivotal movement about a single support point. Each fiber 102 and 104 respectively terminates beyond connectors 124 and 128.

Still referring to FIG. 1, two plano-convex lenses 160 and 162 are mounted within cylindrical barrel portion 140. Lens 160 is mounted in a mounting ring 164 and retained therein by a retaining ring 166. The mounting ring is externally threaded for engagement with barrel interior threaded surface 138. It is preferred herein that a locking ring (not shown), externally threaded for engagement with barrel threaded surface 138, be screwed into the barrel and tightened against mounting ring 164 in order to lock the mounting ring against movement. The locking ring would have a clear aperture at least equal to the lens diameter. Lens 162 is mounted in the same fashion as lens 160. The screw engagement between each mounting ring and the barrel enables accurate positioning of each lens along a longitudinal axis 168 of the barrel. Device 100 is fabricated such that, with the interior brackets and end caps mounted on barrel 140, the end portions of fibers 102 and 104 projecting beyond connectors 124 and 128, respectively, are mounted coaxially with one another and preferably aligned along axis 168. End cap portions 114 and 116, brackets 132 and 144 and barrel 140 may be fabricated from a material such as aluminum.

As clearly shown in FIG. 1, the end of fiber 102 is separated from lens 160 (i.e., there is no contact between the lens and the fiber end) by a first open space (i.e., a space without liquid or solid material) and there is a direct uninterrupted path (i.e., a path which proceeds in a straight line and which does not intersect any intervening components) from the end of fiber 102 to the lens 160. In similar fashion, FIG. 1 also shows that the end of fiber 104 is separated from lens 162 by a second open space and there is a direct uninterrupted path from the end of fiber 104 to the lens 162.

Figure 2:
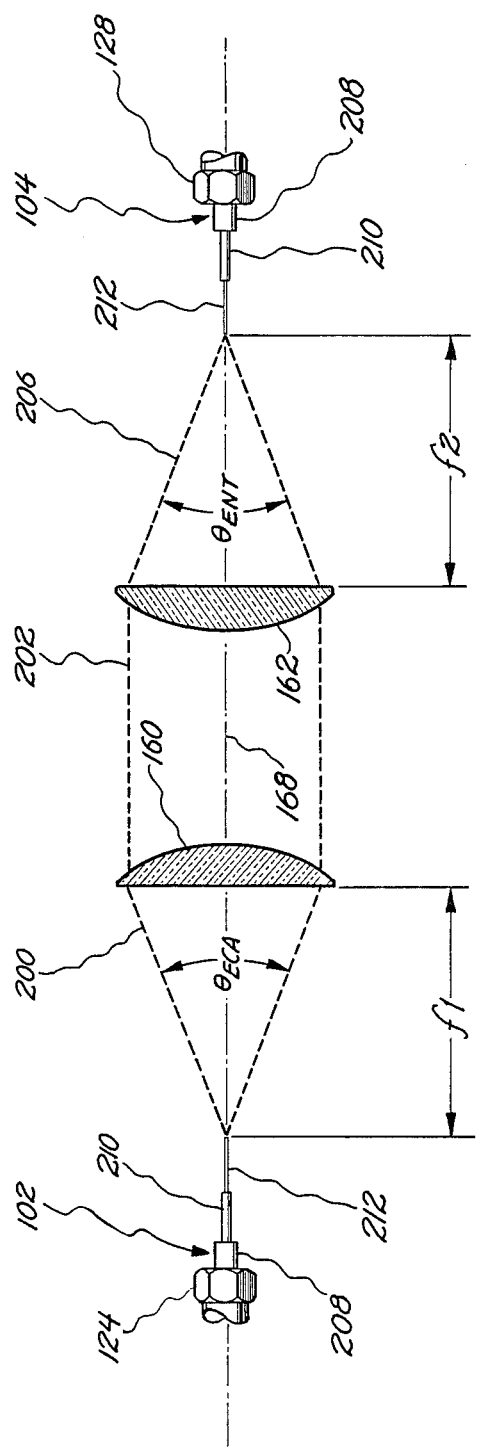
FIG. 2 schematically illustrates the lenses contained in the device illustrated in FIG. 1 in order to better illustrate the operation of that device.

Referring now to FIG. 2, the relative positioning of the respective lenses and fibers is described in greater detail. In FIG. 2, only lenses 160,162, the ends of fibers 102,104 and portions of connectors 124,128 are shown for clarity. In accordance with the first embodiment of the present invention, the power laser beam transmitted through fiber 102 emanates from the end thereof as a diverging beam portion 200 and is collimated by lens 160 into a collimated beam portion 202. The collimated beam portion is then focussed by lens 162 into a focussed portion 206 which is focussed as a spot on the end of fiber 104 for injection into that fiber and the continued transmission of the laser beam through fiber 104. In order to achieve the efficient injection of the power laser beam into fiber 104, various criteria must be met. Since in device 100, all elements are substantially rigidly mounted with only axial adjustments possible due to the screw engagements of various elements, the end portions of fibers 102 and 104 and the axes of lenses 160 and 162 should be coaxial and will preferably lie along axis 168. Each lens 160,162 is preferably fabricated of fused quartz to withstand, without breaking, the heat generated by impingement thereon of the power laser beam being transmitted. Each lens is further preferably coated with a narrow wavelength band antireflection coating selected to maximize transmissivity of the wavelength of the power laser beam being transmitted. Such coatings are well known in the art and lenses so coated are available from CVI Laser, Inc. of Albuquerque, N.M. Another criterion for efficient beam injection is suitable preparation of the respective end portions of fibers 102 and 104. Such end preparation is described in commonly assigned U.S. Pat. Nos. 4,564,736 and 4,676,586 respectively entitled "Industrial Hand Held Laser Tool and Laser System" and "Apparatus and Method for Performing Laser Material Processing Through a Fiber Optic" which are incorporated in their entirety herein by reference. The appropriate end preparation, not illustrated in FIG. 1, is shown diagrammatically in FIG. 2 for each fiber 102 and 104. Thus, with respect to both fibers 102 and 104, the successive portions 208, 210 and 212 of each fiber respectively correspond to the fiber with jacket, fiber without jacket but with cladding exposed and fiber with the bare core exposed without cladding. It is noted that while in the above incorporated patents, end preparation is described with respect to a fiber into which a power laser beam is being injected, it is preferred herein that the fiber from which the beam emanates, i.e. fiber 102, also be prepared in the same fashion. This is done to assure that a uniformly conical beam emanates from the end of that fiber and, further, that the emanating beam does not cause burning of the fiber cladding or fiber jacket.

Lens 160 which collimates the beam has a focal length f1 and is positioned at the distance f1 from the end of fiber 102. The selection of f1 therefore depends on the emitted cone angle with which beam portion 200 emanates from fiber 102 and the desired diameter of collimated beam portion 202. As described hereinbelow, the size of the focussed spot on the end of fiber 104 depends in part on focal length f1. The above incorporated patents as well as commonly assigned U.S. Pat. No. 4,681,396 entitled "High Power Laser Energy Delivery System", which is incorporated in its entirety herein by reference, describe the criteria for efficient injection of a power laser beam into the prepared fiber end. These criteria include the focussed spot size being less than the diameter of the fiber core and the entry cone angle ($\theta_{ENT}$ in FIG. 2) being less than two times the angle corresponding to the numerical aperture of the fiber. These criteria determine the selection of the focal length f2 of lens 162 which focuses the beam on the end of fiber 104, that lens being positioned a distance f2 from the fiber 104 end.

The beam quality of the beam emitted from fiber 102, designated BQ1, is approximately given by:

$$BQ1 = d1 \times \theta_{ECA} \qquad (1)$$

where d1 is the diameter of the core of fiber 102 and $\theta_{ECA}$ (shown in FIG. 2) is the cone angle of the emitted beam. The beam diverges to the diameter $D_{COL1}$ of the collimated beam, so that $\theta_{ECA}$ can be expressed as:

$$\theta_{ECA} = \frac{D_{COL1}}{f1} \qquad (2)$$

This expression for $\theta_{ECA}$ can be substituted into equation (1) to provide the following expression for BQ1:

$$BQ1 = d1 \times \frac{D_{COL1}}{f1} \qquad (3)$$

Turning attention to focussed beam portion 206, the beam quality of that beam portion, designated BQ2, can be expressed as:

$$BQ2 = \frac{D_{COL1} \times S1}{f2} \qquad (4)$$

where S1 is the diameter of the focussed spot on the of fiber 104. Solving equation (4) for the spot size yields:

$$S1 = \frac{BQ2 \times f2}{D_{COL1}}. \qquad (5)$$

As is well known in the art, however, the beam quality of the beam emitted from fiber 102 must be identical to the beam quality of the beam focussed onto the end of fiber 104, i.e. BQ1=BQ2. Therefore, the expression for BQ1 in equation (3) is substituted for BQ2 in equation (5) to provide:

$$S1 = \frac{BQ2 \times f2}{D_{COL1}}. \qquad (5)$$

Thus for a given diameter d1 of fiber 102, it is necessary to select the respective focal lengths of lenses 160 and 162 such that the focal length ratio f2/f1 yields a focussed spot size smaller than the diameter of fiber 104 core. As noted above, this focal length selection must also be made subject to the constraint that f2 provides an entry cone angle that is less than two times the angle corresponding to the numerical aperture of fiber 104. It is noted that, subject to the above described beam injection criteria and equation (6), the diameter of the fiber 102 core may be less than, equal to or greater than the diameter of the fiber 104 core. In general, the laser beam diameters referred to herein are defined as a diameter at which the beam intensity drops to $1/e^2$ of the peak beam intensity, where "e" is the base of the Napierian logarithmic system.

As an optional feature, coupling device 100 may be provided with a plurality of devices, such as photodiodes, for detecting radiation intensity level within the enclosure provided by barrel 140. Referring again to FIG. 1, optional photodiodes 250 and 252 are shown mounted on a surface 254 of bracket 132 and, similarly, photodiodes 256 and 258 are mounted on a surface 260 of bracket 144. The photodiodes would preferably have selective sensitivity to the wavelength of the power laser beam being transmitted. For example, for a neodymium doped yttrium-aluminum-garnet (Nd:YAG) laser, each photodiode may be provided as a model no. OSI5L photodiode manufactured by Centronics Corporation of Mountainside, N.J. The radiation intensity level information provided by the photodiodes can be utilized for a number of purposes. With respect to photodiodes 250 and 252, proximate the fiber 102 end, an increase in detected intensity level relative to a reference level corresponding to normal coupling device operation, may indicate damage to the tip of fiber 102. For example, the end of fiber 102 is required to be planar and perpendicular to the fiber axis, in accordance with the above incorporated patents directed to fiber end preparation. If the end of fiber 102 loses that shape, the beam cone emitted from that fiber end would have an irregular shape which may result in some portion of the emitted beam impinging on the interior of barrel 140 and reflecting back onto the photodiodes. The photodiodes would therefore detect an increase in radiation intensity level. As a further example, beam impingement on the barrel could also occur due to axial misalignment of fiber 102. With respect to photodiodes 256 and 258, an increase in detected normal level corresponding to efficient beam injection into the end of fiber 104 would serve to indicate improper injection of fiber 104 due to fiber misalignment or damage of the fiber 104 end. In FIG. 1, an electrical lead from each photodiode is brought out of coupling device 100 and into a detector circuit 262. Circuit 262 includes circuitry to monitor the signals provided by the respective photodiodes in order to detect an increase in radiation level relative to a reference level and provide a signal on an output 264 upon detecting such an increase. The signal so provided on output 264 could be used to shut down the laser generating the power laser beam being coupled through device 100. The requisite detector circuitry for circuit 262 is within the skill of the art. An exemplary construction of detector circuit 262 is disclosed in commonly assigned, allowed U.S. patent application Ser. No. 010,657, which is incorporated in its entirety herein by reference. With the detected radiation levels of the four diodes 250, 252, 256, 258 available, additional circuitry could be provided within circuit 262 to monitor the difference between the radiation levels detected proximate the fiber 102 end and the fiber 104 end. This difference represents the losses normally experienced in transmitting the laser beam through the lenses and injecting it into fiber 104. Detection of a larger radiation level difference would serve to indicate possible damage to one or more lenses. Circuitry to monitor this radiation level difference is within the skill of the art.

While coupling device 100 constructed in accordance with the first embodiment of the present invention requires precise construction in order to provide coaxial alignment of the fiber ends and proper positioning of lenses 160 and 162, the invention is not so limited. FIG. 3a illustrates a coupling device 300, also constructed in accordance with the first embodiment of the present invention, i.e. employing two lenses to couple fibers 102 and 104, which differs from device 100 in its provision of adjustable fiber holders. Thus, device 300 comprises fiber optic holders 302 and 304 for respectively supporting fibers 102 and 104. Holders 302 and 304 are each illustrated and preferably provided as a model no. 07 HFO 002 fiber holder manufactured by Melles Griot of Irvine, Calif. The holder is further illustrated in an end view t in FIG. 3b which is section 3b—3b of FIG. 3a fiber 102 and 104 is supported in a split half holder 306 and 308, respectively, which is in turn held within a central bore of its respective fiber holder. Each split half holder is cylindrical in cross section and preferably fabricated of quartz. As seen in FIG. 3b, the two halves of the split half holder when aligned form a groove of approximately square cross section. The groove has a width and depth selected such that when a fiber lies in the groove sandwiched between the split halves, the faces of the split halves do not touch. The split half holder is held in the fiber holder central bore by set screws, not shown. Each split half holder is positioned along the fiber away from the end thereof to assure no impingement of the laser beam thereon. In any event, the provision of the split holder fabricated of quartz, which is substantially laser beam transparent, obviates any potential burning problem otherwise resulting from laser impingement. Each fiber holder has fluted adjustment knobs 310, 312 and 314 for adjustment of the fiber held therein in three mutually orthogonal directions. Additional adjustment knobs 316 and 318 enable adjustment about two tilt axes. Thus, provision of fiber holders 302 and 304 enables precise adjustment of the ends of fibers 102 and 104 to assure efficient coupling of a power laser beam therebetween. It is noted that the ability to achieve precise alignment between fiber ends substantially eliminates the possibility of the power laser beam impinging on fiber supporting elements. As a result, the split holder could be fabricated of a material other than quartz, e.g. plexiglass.

Figure 3:
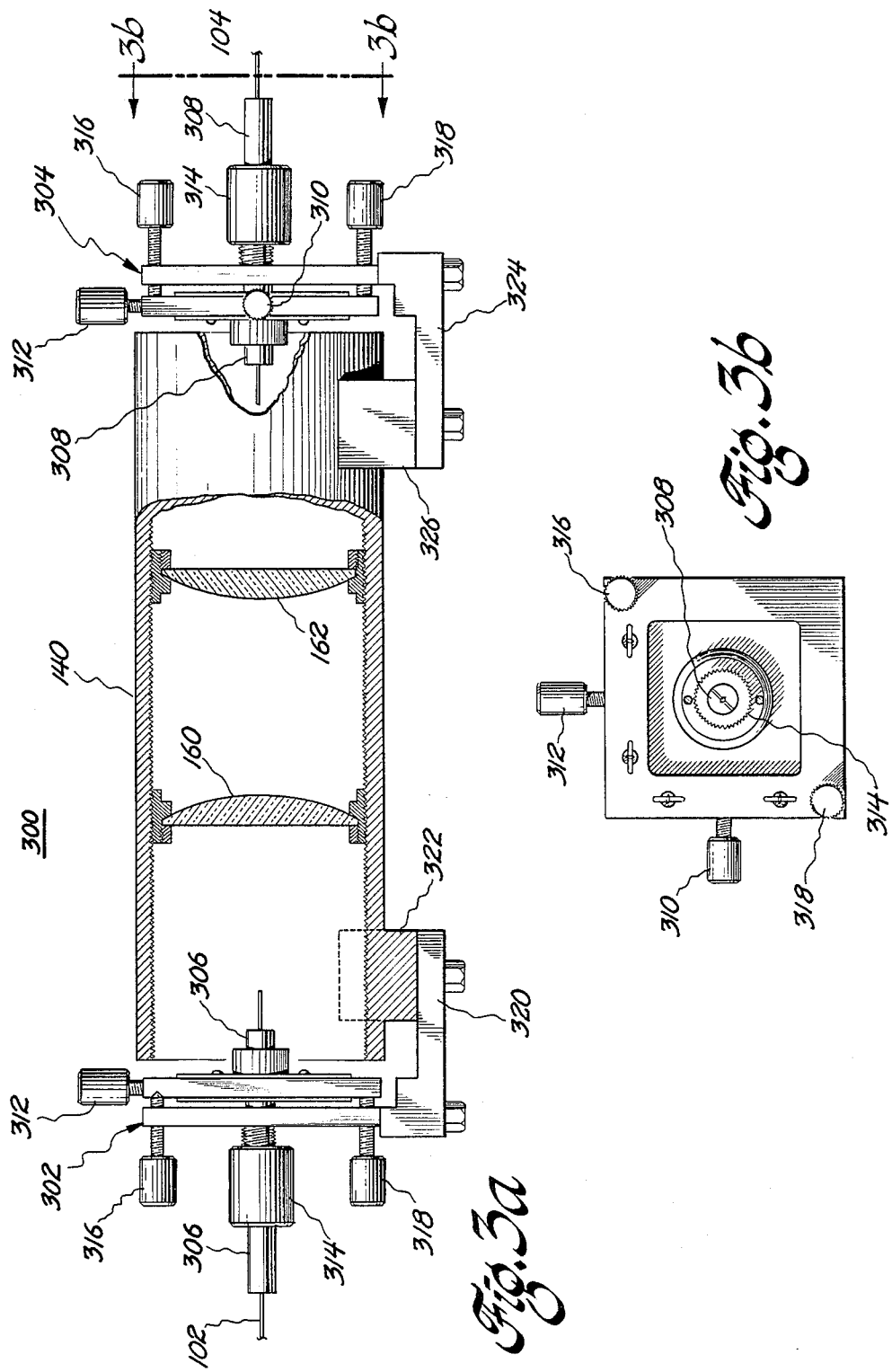
FIGS. 3a and 3b illustrate an alternate construction of fiber optic coupling device constructed in accordance with the first embodiment of the present invention.

Still referring to FIGS. 3a and 3b, fiber holder 302 is bolted to one end of a base plate structure 320. A bracket 322 is ri affixed to barrel 140 and bolted to the opposite end of plate 320. In similar fashion, fiber holder 304 is bolted to one end of a base plate structure 324. A bracket 326 substantially identical to bracket 322 is rigidly affixed to barrel 140 and bolted to the opposite end of plate 324. Brackets 322 and 326 may be affixed, such as by bolting, to barrel 140 or formed as an integral part of the barrel during barrel fabrication. Alignment between fibers 102 and 104 achieve efficient coupling is accomplished by initial adjustment of the fiber end positions, using optical holders 302 and 304, while transmitting a helium-neon low laser beam or a high power laser beam, operated at low power. It is noted that the above described optional photodiodes and associated detector circuit may be installed with equal effect for practice with device 300, though this is not shown in FIG. 3. In such a case, the photo could be mounted on the face of each fiber holder 302 confronts its respective open end of barrel 140.

In with the coupling device of the first embodiment provided as illustrated in FIG. 1 with the rigid of elements or in FIG. 3 with adjustability of fiber positions, the power laser beam transmitted through fiber 102 is emitted from the end thereof and collimated by 160. The collimated beam is then focussed by lens 162 onto the end of fiber 104 for injection into that fiber and transmission therethrough.

Figure 4:
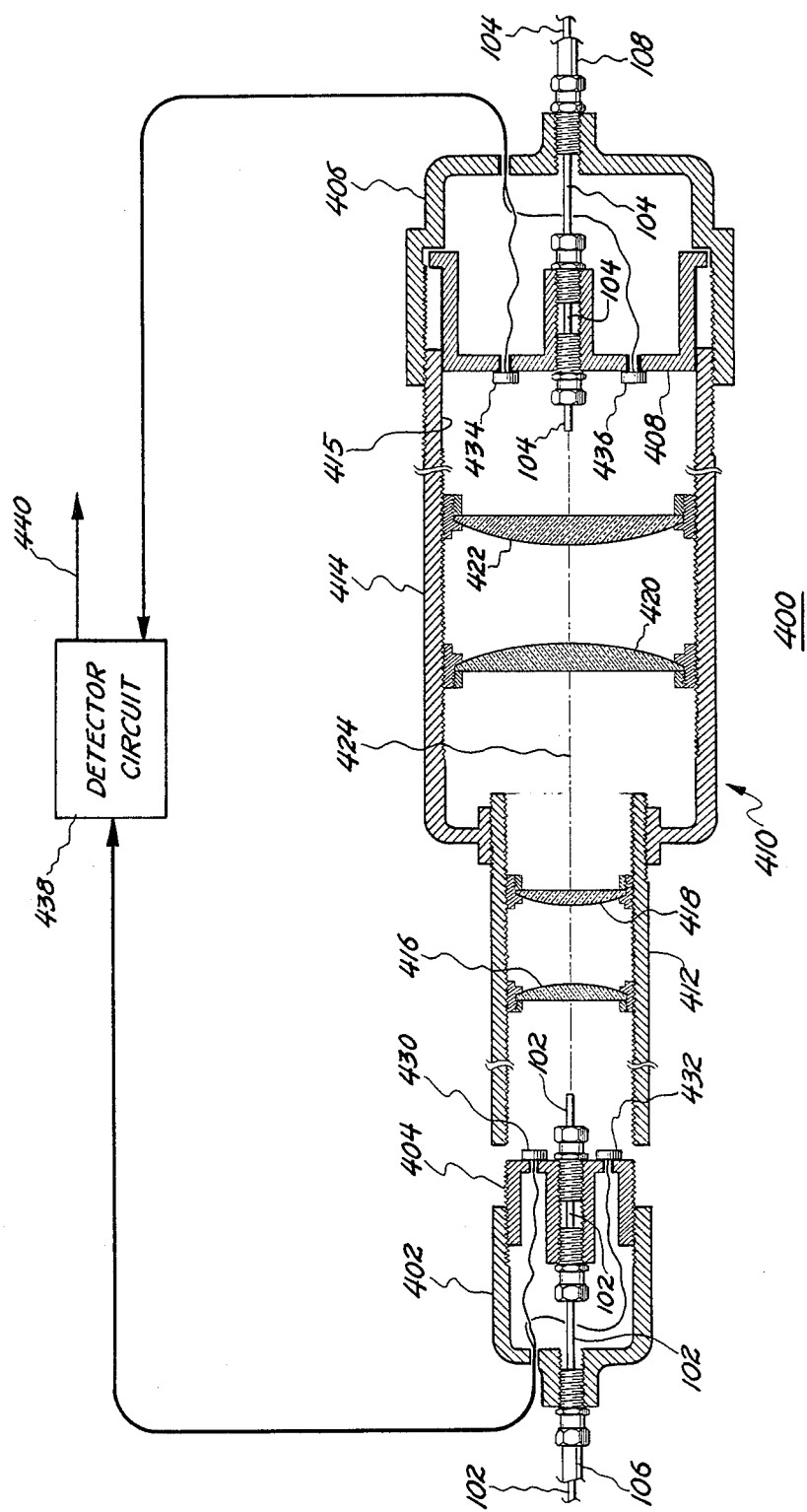
FIG. 4 illustrates a fiber optic coupling device constructed in accordance with a second embodiment of the present invention.
Figure 5:
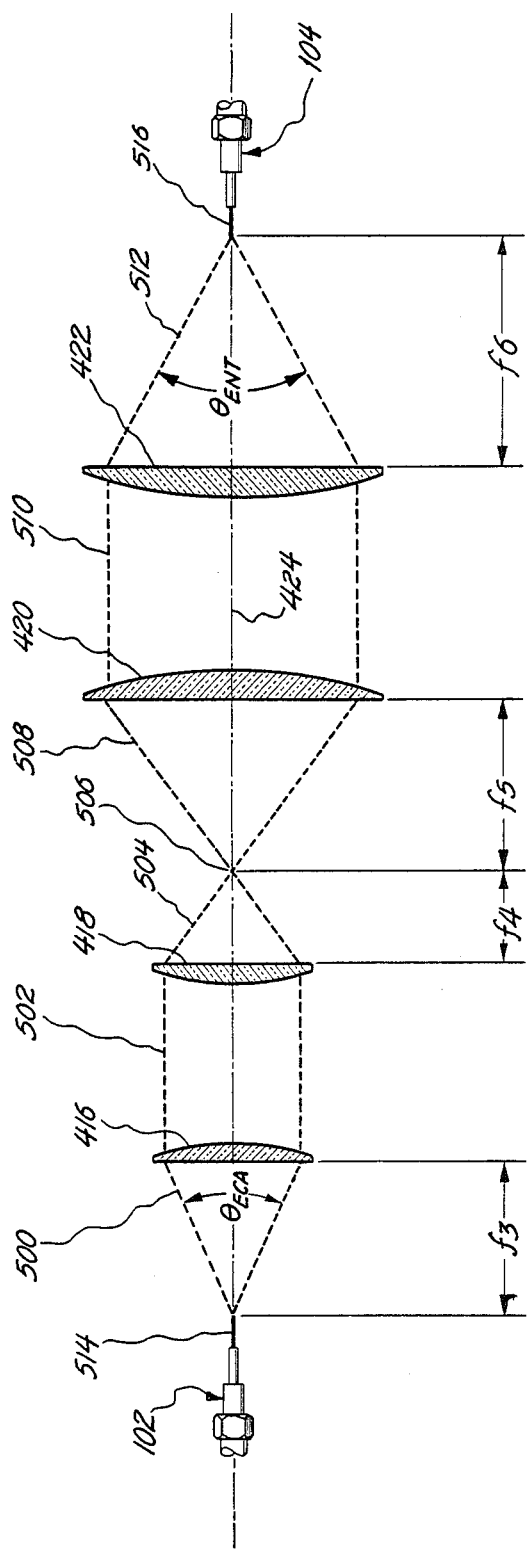
FIG. 5 schematically illustrates the lenses contained in the device illustrated in FIG. 4 in order to better illustrate the operation of that device.

In accordance with the above equations, it was noted that it is desirable to select the lens focal lengths to achieve the required spot size while also satisfying the entry cone angle criterion. Given certain combinations of beam quality of the beam emitted from fiber 102 and respective fiber diameters to be coupled, it may be impossible to select values of f1 and f2 that enable coupling of the two fibers in accordance with the first illustrated embodiment of the present invention. In such a case, it would be necessary to construct the beam coupling device in accordance with a second embodiment of the present invention which is illustrated in FIGS. 4 and 5. FIG. 4 illustrates a coupling device 400 constructed in accordance with the second embodiment. Fibers 102 and 104 are again being coupled and are terminated in device 400 using connectors such as described with respect to the construction of device 100 (FIG. 1). Since the number and use of the connectors in device 400 is identical to that of device 100, they are not individually identified in FIG. 4. Fiber 102 is supported by one connector, in which its protective tube 106 is terminated, in an end cap portion 402. The balance of the fiber is supported in two connectors mounted in an interior mounting bracket 404 which is mounted and in threaded engagement with end portion 402. End portion 402 and interior bracket 404 are constructed substantially identically to end portion 114 and bracket 132 of device 100. Fiber 104 is supported by one connector, in which its protective tube 108 is terminated, in an end cap portion 406. The balance of fiber 104 is supported by two connectors mounted in an interior mounting bracket 408. While end portion 406 and bracket 408 are constructed to have a larger diameter than the corresponding elements at the left end (as viewed in FIG. 4) of device 400, end portion 406 and bracket 408 are otherwise configured substantially identically to end portion 116 and bracket 144 of device 100.

Device 400 further includes a barrel portion 410 comprising a small bore portion 412 and a large bore portion 414. The small and large bore portions are joined by threaded engagement. Device 400 is illustrated as partially exploded in FIG. 4 such that brackets 404 and 408 are not shown fully installed in bore portions 412 and 414, respectively. However, portion 412 is internally threaded so that when device 400 is fully assembled, the internal threading of portion 412 engages the external threaded surface of bracket 404. An internal surface portion 415 of large bore portion 414 is smooth and sized to receive bracket 408 with a tight sliding fit. Bracket 408 and end cap portion 406 are configured and large bore portion 414 externally threaded such that when device 400 is assembled, bracket 408 is mounted in large bore portion 414 in the same manner bracket 144 is mounted in barrel 140 of device 100 (FIG. 1). Two plano-convex lenses 416 and 418 are mounted in small bore portion 412 and two plano-convex lenses 420 and 422 are mounted in large bore portion 414. The mounting and retaining ring used to mount each of these lenses are of the same type as described for device 100 and are not individually identified with respect to device 400. Additionally, locking rings (not shown) would preferably be provided in device 400 in the manner described hereinabove with respect to device 100. The elements of device 400 are constructed and assembled so that the end portions of fibers 102 and 104 as well as the respective axes of lenses 416, 418, 420 and 422 are all coaxial with one another and preferably also coaxial with a device axis 424 about which barrel portion 410 is coaxial. As in the case of device 100, the barrel portion, end cap portions and interior brackets of device 400 may be fabricated from a material such as aluminum. Also, as provided for device 100, coupling device 400 may be provided with optional photodiodes 430 and 432, mounted on bracket 404, and photodiodes 434 and 436, mounted on bracket 408, which detect radiation intensity level. The photodiodes are diagrammatically illustrated as connected to a detector circuit 438 to which they provide their respective signals. Detector circuit 438 is constructed substantially identically to the above described circuit 262 and provides an output signal on an output 440 for a use such as to shut down the laser transmitting the beam being coupled through device 400.

FIG. 5 illustrates, for clarity, only the lenses of device 400 and their positioning relative to one another and to fibers 102 and 104. In accordance with the second embodiment of the present invention, the power laser beam transmitted through fiber 102 emanates from the end thereof as a diverging beam portion 500 and is collimated by lens 416 into a collimated beam portion 502. That collimated beam portion is applied to lens 418 which focuses the beam as a focussed portion 504 onto its focal point 506. The beam diverges beyond focal point 506 into an expanding beam portion 508 which falls incident on lens 420. That lens collimates beam portion 508 into a collimated beam portion 510 which has a larger diameter than collimated portion 502. Finally, lens 422 focuses collimated portion 510, as a focussed portion 512, as a spot on the end of fiber 104 for efficient injection into that fiber and continued transmission of the power laser beam through fiber 104. As was the case with device 100, the elements of device 400 are rigidly mounted with respect to one another in order to achieve the above described coaxial alignment that enables efficient injection of the power laser beam into fiber 104. The screw engagement of the various elements provides latitude to effect axial adjustment in the relative positions of elements. Also as in the case of device 100, lenses 416, 418, 420 and 422 are preferably fabricated of fused quartz and provided with the above described narrow band coating. For the successful operation of device 400, the above described criteria for efficient power laser beam injection must be met. To wit, the respective end portions of fibers 102 and 104 are diagrammatically illustrated as prepared in accordance with the above incorporated patents so that, in FIG. 5, the beam emanates from a core portion 514 of fiber 102 and is injected into a core portion 516 of fiber 104.

The selection of the respective focal lengths and positioning of the lenses of device 400 is next described. As indicated above, in order to select lens focal lengths effective to meet the spot size and entry cone angle criteria for successful beam injection, a plurality of parameters must be considered. Lens 416 for collimating the emitted beam has a focal length f3 and is positioned the distance f3 from the end of fiber 102. As described with respect to the selection of the collimating lens focal length for device 100, selection of f3 depends on the emitted cone angle, $\theta_{ECA}$, with which the beam emanates from fiber 102 and the desired diameter of collimated beam portion 502. Lens 418 has a focal length f4 and lens 420, which has a focal length f5, is spaced a distance equal to the sum of f4 and f5 from lens 418. Thus, lens 420 is positioned to intercept the diverging beam beyond the focal point of lens 418. Lens 420 serves to collimate the diverging beam into collimated portion 510 which has a larger diameter than collimated portion 502. Together, lenses 418 and 420 therefore serve to expand collimated beam portion 502 into collimated beam portion 510. As will be described further below, the ratio of focal lengths f5/f4 is referred to as the beam expansion factor and represents the increase in diameter from collimated portion 502 to collimated portion 510. Lens 422 has focal length f6 and is therefore spaced the distance f6 from the end of fiber 104 onto which it focuses beam portion 512. Following an approach analogous to the one used hereinabove in deriving equations (1)–(6), the following equation (7) can be derived to express the spot size diameter focussed by lens 422 onto the end of fiber 104:

$$S2 = d1 \times \frac{f6}{f3} \times \frac{1}{f5/f4} \tag{7}$$

where d1 is the diameter of the core of fiber 102. As can be seen from equation (7), the spot size S2 is inversely proportional to the beam expansion factor, so that device 400 provides the flexibility of selecting lenses 418 and 420 to achieve an expansion factor that provides an acceptable spot size. Further, such a selection can be made in conjunction with the selection of lens 422 with a focal length f6 that enables meeting the entry cone angle ($\theta_{ENT}$) criterion. Thus, the advantage provided by the fiber coupling device constructed in accordance with the second embodiment of the present invention is the ability to expand the laser beam to achieve an acceptable spot size irrespective of the relative sizes of the fibers being coupled and the beam quality of the transmitted beam. It is noted that if the expansion factor f5/f4 is selected equal to 1, no expansion results and the spot size provided by equation (7) is the same as provided by equation (6) which is descriptive of the first embodiment.

An alternative way of viewing the desirable result achieved by expanding the laser beam within coupling device 400 is by way of the following alternate expression for focussed spot size diameter:

$$S2 = f6 \times \theta_{D2} \tag{8}$$

where $\theta_{D2}$ is the divergence of beam collimated portion 510. As is well known in the art, a collimated beam which is expanded maintains its beam quality which is the product of its diameter and divergence. Thus, expanding the collimated beam within device 400 serves to increase its diameter and decrease its divergence. As seen from equation (8), it is desirable to decrease the divergence of beam portion 510 since this serves to decrease the spot size diameter. As a result, lenses 418 and 420 serve to expand collimated beam portion 502 into collimated beam portion 510 which has a larger diameter and smaller divergence, so that lens 422 can achieve a smaller focussed spot size diameter corresponding to the smaller divergence of beam portion 510.

Figure 6:
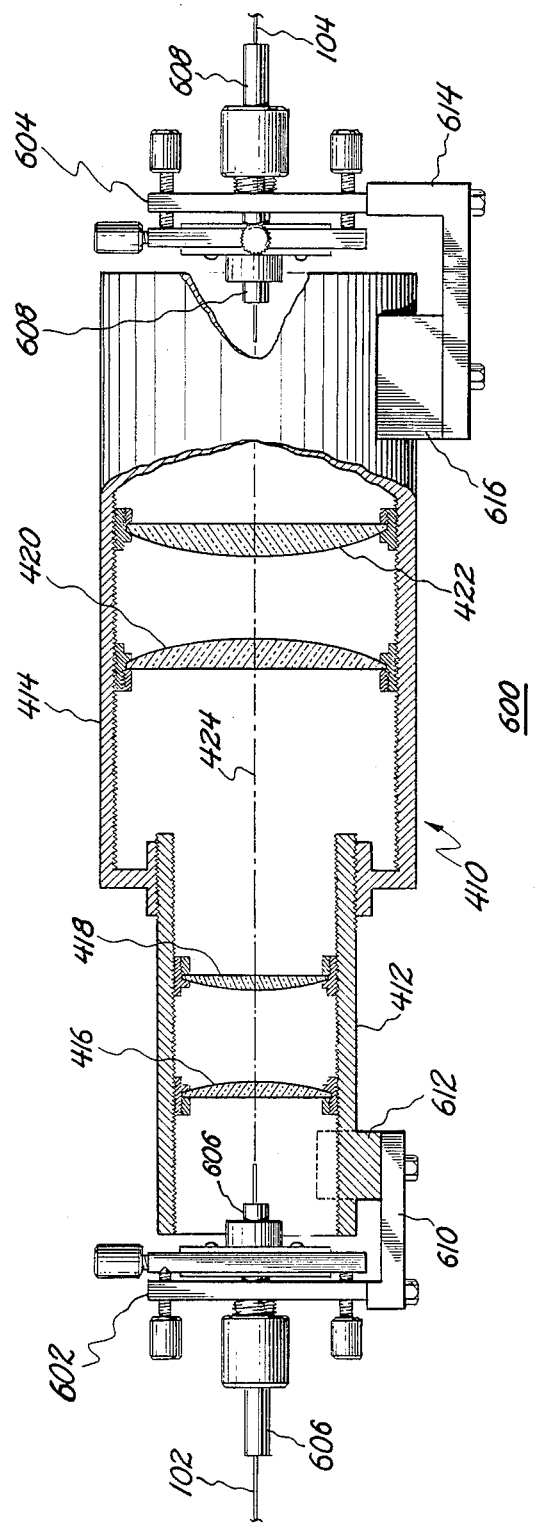
FIG. 6 illustrates an alternate construction of the fiber optic coupling device constructed in accordance with the second embodiment of the present invention.

The coupling device constructed in accordance with the second embodiment of the present invention may be provided as device 600 illustrated in FIG. 6, which differs from device 400 only by replacement of the connectors and their supporting structure with a multi-axis adjustable support for each fiber 102,104. Thus, in a manner analogous to which device 100 of the first embodiment was modified to provide device 300, device 600 comprises fiber optic holders 602 and 604 for respectively supporting fibers 102 and 104. Holders 602,604 are each illustrated as the above described model no. 07 HFO 002 fiber holder manufactured by Melles Griot of Irvine, Calif. Thus, each fiber holder is adjustable along three mutually orthogonal axes and two tilt axes. Fibers 102 and 104 are respectively supported within split half holders 606 and 608 within fiber holders 602 and 604. The split half holders 606,608 are constructed the same as described above for device 300.

Also, as noted above, the split half holder is positioned away from the fiber tip as distinguished from the ferrules utilized in prior art connectors. Fiber holder 602 is bolted to one end of a base plate structure 610. A bracket 612 rigidly affixed to small bore portion 412 is bolted to the opposite end of the base plate. In similar fashion, fiber holder 604 is bolted to one end of a base plate structure 614. A bracket 616 is rigidly affixed to large bore portion 414 and bolted to the opposite end of base plate 614. Each bracket 612 and 616 may be affixed to its respective bore portion in the manner described above for brackets 322 and 326 of device 300 (FIG. 3a). As described above with respect to device 300, the adjustable fiber holders obviate the need for precise machining and mounting of the elements of the coupling device. Alignment between fibers 102 and 104 to achieve efficient coupling can instead be accomplished by initial adjustment of the fiber ends while transmitting a helium-neon low power laser beam or a high power laser beam operated at low power. Coupling device 600 may optionally be provided with photodiodes in the manner described for device 300.

In operation, the second embodiment of the present invention constructed as device 400 or device 600 couples the beam transmitted through fiber 102 and emitted from the end thereof, into the end of fiber 104 for transmission therethrough. The emitted beam is collimated and then expanded in order to reduce its divergence and enable achievement of a smaller focussed spot size. The expanded beam is focussed onto the end of fiber 104 such that the entry cone angle ($\theta_{ENT}$) of the focussed beam is less than two times the angle corresponding to the numerical aperture of fiber 104 and the focussed spot size is less than the diameter of the fiber 104 core.

The second embodiment of the present invention was successfully practiced utilizing an aspheric lens 35 mm in diameter with a 35 mm focal length for lens 416, a plano-convex lens 25 mm in diameter with a 50 mm focal length for lens 418, a plano-convex lens 40 mm in diameter with a 300 mm focal length for lens 420 and a plano-convex lens 25 mm in diameter with a 50 mm focal length for lens 422. With the lenses so provided, a neodymium doped yttrium-aluminum-garnet (Nd:YAG) pulsed (15 Hz, 7 mm pulse length) laser beam with an average power of approximately 200 watts was coupled from a 0.8 mm diameter fiber into a 0.6 mm diameter fiber.

It is noted that as distinguished from the above noted prior art connecting devices, no ferrule of any sort is positioned on either fiber being coupled proximate the end thereof, so that there is no susceptibility to ferrule damage and resulting connector failure. With respect to devices 300 and 600, the split half holders utilized with the fiber holders are positioned along each fiber away from the end thereof. Further, each such split half holder is preferably fabricated from quartz in order to eliminate any risk of heating or burning of the split holder. Additionally, the ability to precisely align the fiber ends, utilizing the multi-axis fiber holders, eliminates the possibility of burning due to fiber misalignment where, in the prior art, such misalignment resulted from imperfect fabrication of the connector devices. Also as distinguished from th prior art fiber coupling techniques, there is no limitation in the practice of the present invention, in accordance with either embodiment, to single mode operation. Coupling devices constructed in accordance with the present invention may be used to couple single or multimode fibers and, as is readily apparent from the description hereinabove, are provided with features enabling coupling of fibers carrying a high power laser beam. As is well known in the art, transmission of such a high power laser beam can only be accomplished through multimode fibers. The coupling devices of the present invention are clearly distinguishable from the above described LAMDEK device in a number of respects. First, the latter device requires cementing to achieve physical contact between the fiber end, its associated glass ferrule and the lens surface. As indicated above, such cements are unsuitable for exposure to a high power laser beam. Further, in each coupling device constructed in accordance with the present invention, there is no contact between the fiber end and proximate lens. Such contact would in all likelihood result in scratching of the narrow band lens coating and thereby reduce transmission efficiency. Also, the above described LAMDEK device requires use of aspheric glass lenses. As previously described, the use of glass lenses, as distinguished from fused quartz, is unsuitable for transmission of a high power laser beam where the beam power density may be sufficient to cause failure of the glass. Also, while the coupling devices of the present invention may be constructed using aspheric lenses, they can be constructed and successfully practiced using plano-convex lenses. Additionally, the LAMDEK device utilizes the ends of the fibers being coupled in their as-cleaved condition. The inventors herein believe it would not be possible to successfully couple a high power laser beam between such unprepared fiber ends. It is necessary to prepare the fiber ends being coupled, in the manner described above, for the successful practice of the present invention.

While the coupling device of the present invention illustrated and described hereinabove comprises a tubular structure, the invention is not so limited. The connectors or fiber holders used for supporting the ends of the fibers being coupled as well as the lenses for focussing, collimating or expanding the laser beam, may be mounted in any enclosure effective to provide rigid support. For example, the elements comprising the inventive coupling device may instead be rigidly mounted on an optical breadboard which is in turn contained in a protective enclosure.

While with respect to both embodiments of the present invention illustrated and described hereinabove, plano-convex lenses are utilized, the invention is not so limited. Any lens type or combination of lenses may be used in place of each lens illustrated herein so long as the replacement lens performs the appropriate focussing, collimating or expanding function. For example, lens 418 of the second embodiment may instead be provided as a plano-concave or double concave lens which would provide a diverging beam to be collimated by lens 420.

While coupling devices 300 and 600 described hereinabove are provided with two multi-axis adjustable optical fiber holders to hold the two fibers being coupled, the invention is not so limited. Either such device may be provided with only one holder to support one of the two fibers, while the other fiber is supported with the connectors and structure contained in devices 100 and 400. The coupling device provided with a single optical fiber holder would still have substantial adjustability to achieve precise alignment between the respective ends of the fibers being coupled.

While the invention has been described hereinabove as constructed with connectors for supporting the optical fibers being coupled, the invention is not so limited. Other techniques for supporting the fibers will now occur to those skilled in the art. For example, the split holders supported within the multi-axis adjustable fiber holders can instead be adapted for mounting in appropriate hardware for rigidly supporting them, and the fiber within, at opposing ends of the inventive coupling device.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. Apparatus for coupling a high power laser beam transmitted through a first optical fiber having a portion remote from the apparatus into a second optical fiber having a portion remote from the apparatus, comprising:

first lens means for collimating the high power laser beam emitted from an end of the first fiber;

second lens means for focussing a collimated laser beam applied thereto onto an end of the second fiber;

the respective ends of said first and second fibers being prepared in advance in predetermined fashion for fiber coupling;

said second lens means focussing the collimated beam applied thereto to achieve an entry cone angle that is less than two times an angle corresponding to a numerical aperture of the second fiber and a focussed spot having a diameter that is less than the diameter of a core portion of the second fiber; and means for mounting said first and second lens means and said first and second fiber ends in alignment so that the power laser beam transmitted through the first fiber and emitted from the end thereof is collimated by said first lens means and focussed by said second lens means onto the second fiber end for injection into the second fiber and transmission therethrough, and wherein the apparatus in operation provides that:

said first fiber end is separated from said first lens means by a first open space and there is a direct uninterrupted path from said first fiber end to said first lens means, and said second fiber end is separated from said second lens means by a second open space and there is a direct uninterrupted path from said second fiber end to said second lens means.

2. The apparatus of claim 1 wherein said first lens means provides a first collimated beam portion having a first beam diameter; and said apparatus further including third lens means for expanding the first collimated beam portion into a second collimated beam portion having a second beam diameter greater than the first beam diameter, the divergence of the second collimated beam portion being smaller than the divergence of the first collimated beam portion, so that said second lens means can focus the second collimated beam portion to achieve a smaller spot diameter corresponding to the smaller divergence of the second collimated beam portion.

3. The apparatus of claim 2 wherein said first, second and third lens means include lenses having narrow wavelength band anti-reflective coatings selected for efficient transmission of the wavelength of the power laser beam.

4. The apparatus of claim 1 wherein said first and second lens means include lenses having narrow wavelength band anti-reflective coatings selected for efficient transmission of the wavelength of the power laser beam.

5. The apparatus of claim 1 wherein the first and second fibers are each of the step-index type.

6. The apparatus of claim 2 wherein the first and second fibers are rigidly mounted in alignment with said first and second lens means.

7. The apparatus of claim 2 wherein said first and second fibers are respectively mounted in first and second fiber holding devices each being position adjustable along at least three orthogonal axes.

8. The apparatus of claim 3 wherein said first and second lens means respectively comprise a first and a second plano-convex lens; and said third lens means comprising a third plano-convex lens for focussing said first collimated beam portion and a fourth plano-convex lens positioned beyond a focal point of said third plano-convex lens to collimate as the second collimated beam portion the beam provided by said third plano-convex lens.

9. The apparatus of claim 4 wherein said first and second lens means each comprise a plano-convex lens.

10. The apparatus of claim 1 further including an enclosure for containing said first and second lens means and said first and second fiber ends; and means, positioned proximate said second fiber end, for detecting a laser beam radiation intensity level and providing a signal in proportion thereto;

so that detection of an increase in the detected radiation intensity level beyond a predetermined level corresponding to successful laser beam injection into the fiber second end is an indication of improper injection of the second fiber.

11. Apparatus for coupling a high power laser beam transmitted through a first optical fiber having a portion remote from the apparatus into a second optical fiber having a portion remote from the apparatus, comprising:

first lens means to collimate as a first collimated beam portion the high power laser beam emitted from the end of the first fiber, the first collimated beam portion having a first beam diameter;

second lens means to expand the first collimated beam portion into a second collimated beam portion having a second beam diameter larger than the first beam diameter;

third lens means to focus the second collimated beam portion as a focussed spot on an end of the second fiber;

said third lens means focussing the second collimated beam portion applied thereto to achieve an entry code angle that is less than two times an angle corresponding to a numerical aperture of the second fiber and a focussed spot having a diameter that is less than the diameter of a core portion of the second fiber;

the first and second fibers being of the step-index type and the respective ends thereof being prepared in advance in a predetermined fashion for fiber coupling; and said first, second and third lens means and the first and second fiber ends being mounted in alignment such that the power laser beam transmitted through the first fiber and emitted from the end thereof is collimated by said first lens means into the first collimated beam portion, said second lens means expands the first beam portion into the second beam portion and said third lens means focuses the second collimated beam portion onto the second fiber end for injection into the second fiber end for transmission therethrough, and wherein the apparatus in operation provides that:

said first fiber end is separated from said first lens means by a first open space and there is a direct uninterrupted path from said first fiber end to said first lens means, and said second fiber end is separated from said third means by a second open space and there is a direct uninterrupted path from said second fiber end to said third lens means.

* * * * *